Figure 1:
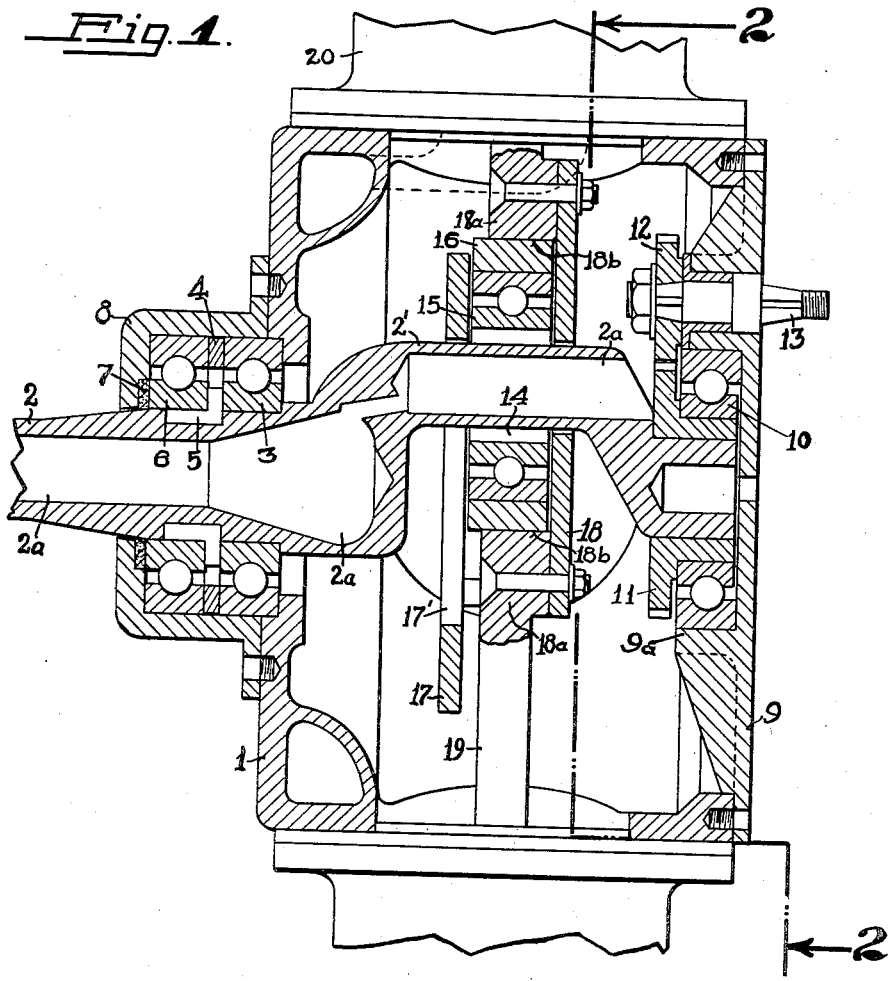

Sept. 12, 1939.  R. L. BOURKE  2,172,670
CRANKCASE VENTILATING MEANS
Original Filed May 12, 1936  2 Sheets-Sheet 1

INVENTOR,
Russell L. Bourke
BY
J. E. Trabucco
ATTORNEY.

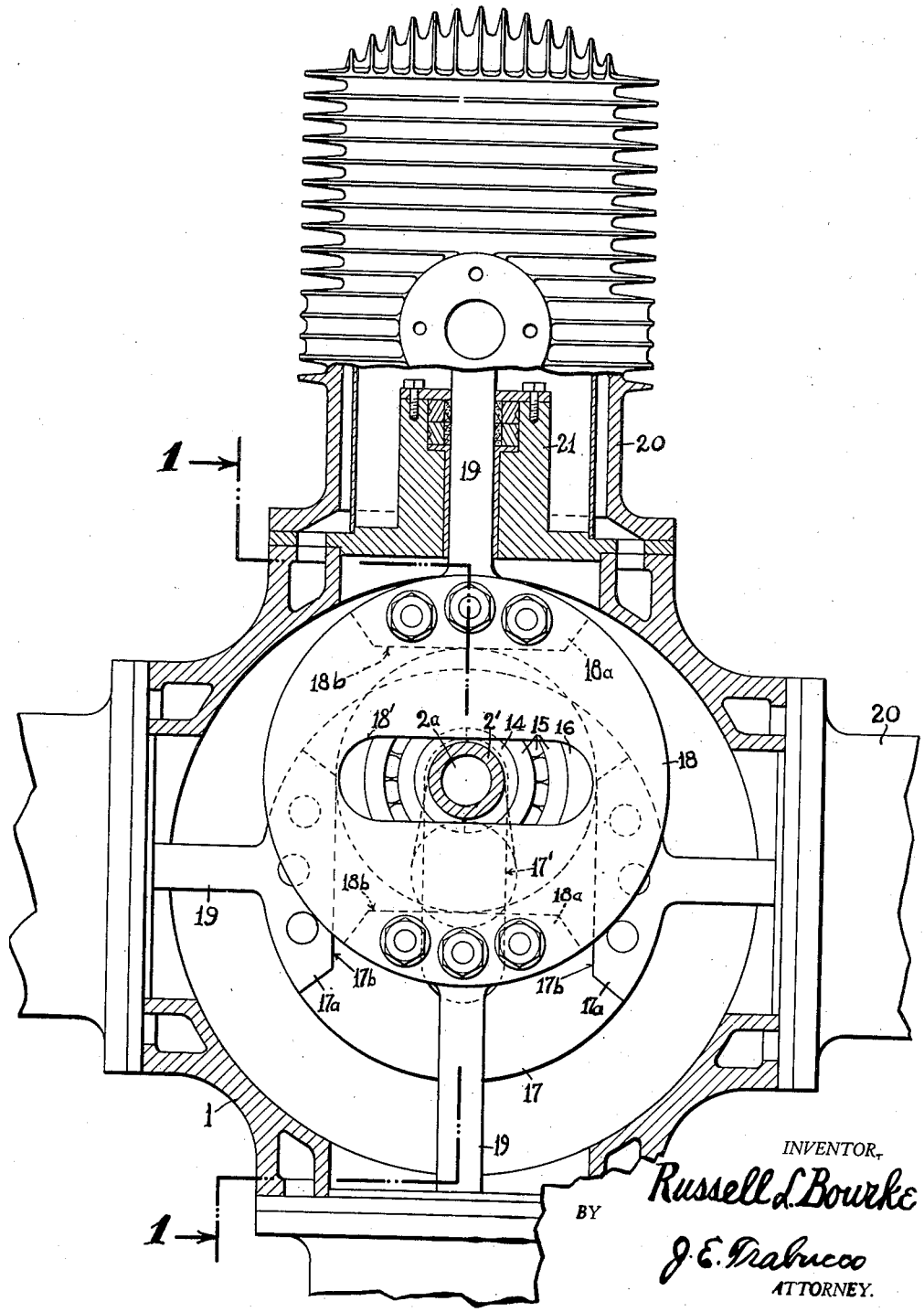

Patented Sept. 12, 1939

2,172,670

UNITED STATES PATENT OFFICE 2,172,670

CRANK CASE VENTILATING MEANS

Russell L. Bourke, Petaluma, Calif.

Original application May 12, 1936, Serial No. 79,288. Divided and this application May 24, 1938, Serial No. 209,731

4 Claims. (Cl. 123—196)

This invention relates to improvements in internal combustion engines and more particularly to novel crank case ventilating means.

An object of my invention is to provide an improved internal combustion engine having a novel crank shaft construction wherein is embodied means for ventilating the crank case, the said means permitting the efficient lubrication of the engine in any position without allowing the loss or escape of any of the lubricant from the crank case.

Another object of my invention is to provide an improved internal combustion engine having a splash or bath system of lubrication, wherein a novel crank shaft construction is embodied which not only permits the ventilation of the engine's crank case at all times irrespective of the engine's operating position, but which at the same time allows the efficient lubrication of the engine without loss or escape of any of the lubricant from the crank case.

Other and further objects of my invention will be pointed out hereinafter, indicated in the appended claims, or obvious to one skilled in the art upon an understanding of the present disclosure. For the purposes of this application I have elected to show herein certain forms and details of crank shaft and bearing assemblies for internal combustion engines which are representative of my invention; the constructions herein shown and described, while capable of use with engines of various kinds, are particularly well adapted for use with internal combustion engines of the type disclosed in my co-pending application for Letters Patent Serial No. 79,288, filed May 12, 1936, of which this application is a division; it is understood, however, that the particular construction herein illustrated is not to be regarded as exhaustive of the variations of my invention nor is it to be given any interpretation such as might have the effect of limiting the claims, short of the true and most comprehensive scope of the invention in the art.

In the accompanying drawings:

Fig. 1 is a vertical sectional view taken on the line 1—1 of Fig. 2, showing a crank shaft and bearing assembly embodying my invention; and Fig. 2 is a sectional view taken on the line 2—2 of Fig. 1.

Referring to the drawings, the numeral 1 designates a crank case having centrally disposed bearings at its front and rear sides within which a crank shaft 2 is rotatably mounted. The crank case is provided with suitable inlet means for the insertion of lubricating oil, the normal level of which is slightly beneath the central axis of the said case, and with packing glands of the customary kind which serve to prevent the escape of oil through the crank shaft bearings. The bearing at the front of the crank case through which the shaft 2 extends is particularly designed to eliminate any whip action on the end of said shaft and to take up the thrust ordinarily accompanying the fast rotation of said shaft in either direction. The shaft 2 is encircled by a thrust bearing 3 which is partly imbedded in an annular groove in the front side of the casing. Also encircling the shaft 2 and spaced from the bearing 3 by a washer 4 and a flanged split bushing 5 which is partly imbedded in an annular groove in said shaft, is a similar bearing 6. A fiber or felt pad 7 encircling the shaft 2 is held against the front side of the bearing 6 by a front or nose plate 8 which is bolted to the crank case 1 and is so shaped and positioned that it encases the bearings 3 and 6 and maintains them in proper operating positions. The bearing 6 being in engagement with the split bushing 5 secured in a fixed position on the shaft 2, the said bushing being in contact with the thrust bearing 3, and the latter being in engagement with the front side of the casing 1, affords a novel and improved construction for taking up the thrust action of the shaft, thereby preventing the usual damaging effect to the shaft's crank arm or throw when the engine is operating at high speeds.

The rear end of the crank case is enclosed by a rear cover plate 9 having an inwardly disposed annular flange 9a within which a bearing 10 is mounted. The bearing 10 is mounted on the hub of a circular gear 11 to which is keyed the rear end of the shaft 2. A circular gear 12 having a rearwardly projecting rod 13 secured thereto for use in starting the engine, is in mesh with the gear 11.

The crank shaft 2 is formed with a suitable crank arm or offset 2' which is adapted to dip into the oil in the crank case during its rotation, the said crank arm having a suitable split bushing 14 extending therearound. Mounted on the bushing 14 is a bearing member 15 having an encircling ring 16 secured thereto. The bearing member 15 is mounted between two co-operating cam plates 17 and 18, each of which is formed in the shape of a circular disc. The cam plates 17 and 18 are provided respectively with elongated slots 17' and 18' through which the crank arm 2' of the crank shaft rotatably and movably extends, the said slots being disposed at right angles to one another. Secured as by bolts to the opposing faces of cam plates 17 and 18 respectively, are blocks 17a and 18a which respectively provide opposing shoulders 17b and 18b over which the ring shaped member 16 of the bearing 15 moves back and forth. The slots 17' and 18' are parallel to the shoulders 17b and 18b respectively, thereby permitting the crank arm 2' and the bearing member 15 with its outer ring 16 to move simultaneously back and forth. Formed integrally with, or otherwise suitably secured to the blocks 17a and 18a are a number of connecting rods 19 which extend into oppositely disposed cylinders 20 bolted to the crank case 1. The connecting rods 19 each slidably extends through a guide member 21 and is secured at its outwardly disposed end to a piston which is mounted for reciprocating motion in a cylinder 20.

The crank shaft 2 and its crank arm 2' are provided with a continuous bore or breather channel 2a which is open to the atmosphere at a point outside the crank case and which provides means for permitting air or gases to proceed to and from the crank case 1 when the temperature of the engine changes. The inwardly disposed end of the channel 2a terminates at the rear end of the horizontal part of the crank arm 2' and at a point not in alignment with that part of the channel located in the shaft proper, thereby preventing the escape of the oil from the interior of the crank case, irrespective of what position the engine might assume.

As illustrated on the drawings each of the bearings 3, 6, 10 and 15 are preferably made up of inner and outer circular spaced races between which are a number of steel balls.

Having described my invention, what I claim is:

1. In an engine, a crank case adapted to contain quantities of oil for lubrication purposes and a crank shaft extending into the crank case having an offset part normally positioned above the normal level of the oil in the crank case but which is adapted to intermittently dip into and out of the oil as the shaft rotates, the said shaft having a breather channel therein which is open at both ends, one end of the channel terminating at a point on the offset part of the shaft and the other end terminating at a point on the shaft externally of the crank case, the said breather channel being so disposed that the portion thereof which extends through the shaft proper is out of alignment with that portion extending through the offset part of the shaft, whereby when the said offset part of the shaft dips into the lubricating oil that part of the breather channel located in the offset part is lower than that part of the channel located in the shaft proper, thereby preventing oil from draining from the crank case through the channel to a point outside the crank case.

2. In an engine, a crank case adapted to contain quantities of oil for lubrication purposes, and a crank shaft extending into the crank case having a crank arm thereon which is located inside the said case, the said crank shaft and its crank arm having a continuous breather channel extending therethrough, one end of which terminates at a point on the shaft located externally of the crank case and the opposite end of which terminates at a point on the crank arm.

3. In an engine, a crank case adapted to contain quantities of oil for lubrication purposes, a crank shaft extending into the crank case, a crank arm on the shaft adapted to dip into the oil in the crank case, and a continuous breather channel located in the shaft and its crank arm, one end of the channel terminating externally of the crank case and its opposite end terminating at a point on the crank arm and inside the crank case.

4. In an engine, a crank case adapted to contain quantities of oil for lubricating purposes, the normal level of said oil being beneath the central axis of the case, a crank shaft extending into the crank case having a crank arm thereon which is adapted to dip into and out of the lubricating oil in the case, and a continuous breather channel extending through the shaft and its crank arm for the passage of air into and out of the crank case, the said channel having that part thereof which extends through the crank arm out of alignment with that part extending through the shaft proper, whereby when the crank arm dips into the lubricating oil that part of the channel located in the crank arm is lower than that part of the channel located in the shaft proper, thereby preventing the oil from running through the channel to a point outside the crank case.

RUSSELL L. BOURKE.